(12) United States Patent
Lake

(10) Patent No.: US 10,428,520 B2
(45) Date of Patent: Oct. 1, 2019

(54) THERMALLY BROKEN FRAMING SYSTEM AND METHOD OF USE

(71) Applicant: Daniel Brian Lake, St. Louis, MO (US)

(72) Inventor: Daniel Brian Lake, St. Louis, MO (US)

(*) Notice: Subject to any disclaimer, the term of this patent is extended or adjusted under 35 U.S.C. 154(b) by 0 days.

(21) Appl. No.: 16/383,104

(22) Filed: Apr. 12, 2019

(65) Prior Publication Data

US 2019/0234069 A1 Aug. 1, 2019

Related U.S. Application Data

(62) Division of application No. 14/934,138, filed on Nov. 5, 2015, now Pat. No. 10,273,686.

(51) Int. Cl.
| | |
|---|---|
| *E04B 2/72* | (2006.01) |
| *E04B 1/76* | (2006.01) |
| *E04B 2/96* | (2006.01) |
| *E04F 13/08* | (2006.01) |
| *E04B 1/24* | (2006.01) |
| *E04B 2/88* | (2006.01) |

(52) U.S. Cl.
CPC .......... *E04B 2/721* (2013.01); *E04B 1/2403* (2013.01); *E04B 1/7612* (2013.01); *E04B 2/967* (2013.01); *E04F 13/0805* (2013.01); *E04B 2/88* (2013.01); *E04B 2001/246* (2013.01); *E04B 2001/2469* (2013.01); *E04B 2001/7679* (2013.01)

(58) Field of Classification Search
CPC .......... E04B 2/72; E04B 2/721; E04B 1/2403; E04B 2001/246; E04F 13/0805
See application file for complete search history.

(56) References Cited

U.S. PATENT DOCUMENTS

| | | | | |
|---|---|---|---|---|
| 5,226,274 | A * | 7/1993 | Sommerstein | E04F 13/0805 52/509 |
| 2004/0200184 | A1* | 10/2004 | Wirth | E04B 2/721 52/782.1 |
| 2012/0247059 | A1* | 10/2012 | Daudet | E04B 1/2403 52/705 |
| 2013/0036683 | A1* | 2/2013 | Seymour | E04B 2/88 52/173.1 |
| 2013/0074431 | A1* | 3/2013 | Croasdale | E04B 2/562 52/272 |

(Continued)

*Primary Examiner* — Paola Agudelo
(74) *Attorney, Agent, or Firm* — Jonathan Brown

(57) ABSTRACT

A thermally broken framing system and method of use are disclosed. The thermal framing system is comprised generally of a structural apparatus, exterior retention framing and a fastener system comprised of thermal spacer material, and structural fasteners. A structural component, such as a T-shaped member with a structural tab may lie flatly against a wall while providing a thermal break. The structural tab is further comprised of apertures located at regular intervals. The exterior retention framing is comprised generally of a retention face represented as and two framing tabs attached to a retention face. The framing tabs have framing tab apertures placed at regular intervals from each other to match the spacing of the structural tab apertures. The structural tab apertures and framing tab apertures are aligned and thermally insulated fastening units placed through the apertures, securing the system.

20 Claims, 4 Drawing Sheets

(56) References Cited

U.S. PATENT DOCUMENTS

| | | | |
|---|---|---|---|
| 2014/0026510 A1* | 1/2014 | Kubassek | E04B 1/40 52/512 |
| 2016/0152410 A1* | 6/2016 | Adams | B65D 88/744 220/636 |
| 2016/0289977 A1* | 10/2016 | Lucchese | E04F 13/0816 |
| 2017/0342735 A1* | 11/2017 | Collins | E04H 9/024 |
| 2018/0030717 A1* | 2/2018 | Yang | E04B 1/2403 |

* cited by examiner

THERMALLY BROKEN FRAMING SYSTEM AND METHOD OF USE

CROSS REFERENCE TO RELATED APPLICATION(S)

This application is a Divisional Application of, and claims the benefit of, U.S. Utility patent application Ser. No. 14/934,138, entitled "THERMALLY BROKEN FRAMING SYSTEM AND METHOD OF USE," filed on Nov. 5, 2015, which in turn claims the benefit of U.S. Provisional Application No. 62/075,651 entitled "THERMALLY BROKEN FRAMING SYSTEM AND METHOD OF USE," filed on Nov. 5, 2014, the subject matter of which are hereby incorporated therein by reference in their entirety.

TECHNICAL FIELD OF THE INVENTION

The present invention relates to the general art of construction technology and more specifically, to the field of exterior wall construction.

BACKGROUND OF THE INVENTION

The thermal conductance of existing cold formed metal framing systems is a continuing concern in construction: particularly the construction of metallic framed structures. Metals, including those greatly used in construction such as iron and aluminum, are typically highly heat conductive. As heat is transferred and lost from the inside to the outside, or vice versa, through the heat-conductive studs themselves, the composite thermal resistance of the framing members and cavity insulation are reduced by approximately fifty percent.

As an example, the ASHRAE (American Society of Heating, Refrigerating and Air-Conditioning Engineers) considers the effective R-value of R-19 fiberglass batt insulation in the stud cavity of a wall framed with 6 inch metal studs at 24 inches on center as R-8.55. The same wall using 2×6 wood studs would be considered as R-19.11 by ASHRAE. However, wood and other-energy-efficient framing materials are often unsuitable for commercial construction requiring incombustible materials and therefore metal framing must be used.

This has costly consequences for power consumption. Lower thermal resistance in an exterior wall assembly causes a building's HVAC systems to use more energy heating and/or cooling to keep the building occupants comfortable. Roughly 40% of the total USA energy consumption in the year 2012 was consumed in residential and commercial buildings. Over 30% of a building's energy consumption is for heating and cooling the building. The United States currently uses about 25 PWh (25 Petawatt-hours=25 billion megawatt-hours) per year which means that approximately 3 PWh of energy is used each year for building heating and cooling.

New requirements for green and energy-efficient buildings are making it more important than ever that these energy-efficiency and heat conductivity issues be addressed. The 2012 IECC (International Energy Conservation Code) has made significant changes to the required thermal resistance of exterior walls in commercial buildings. These changes have been brought in line with recommendation from ASHRAE standard 90.1 (2010 edition). As the 2012 IECC is adopted into law by cities and states for new commercial construction, new buildings will be required to meet increasingly stringent requirements. Meeting these requirements with exterior veneer systems which do not include continuous rigid insulation as part of the system will become more and more difficult.

EIFS (exterior insulation finish systems) is an example of an exterior veneer system with includes continuous rigid insulation as part of the system, limestone veneer is an example of an exterior veneer system which typically does not include continuous insulation as part of the system. Exteriors using continuous rigid insulation and no cavity insulation typically need to have an insulation thickness of at least six inches in order to be effective, which can result in exterior walls with a total thickness of 12 to 18 inches depending on the structural requirements. These walls are also limited to light-weight options for exterior veneers such as EIFS finishes due to the greater distance between the veneer and the structural framing.

These more stringent requirements are addressed to some degree by a method of construction wherein there an outer shell, often metallic, is supported by framing members protruding from a weather/air barrier often comprised of an inner frame, and lying between the inner and outer frame is a cavity, usually comprised of air, which acts as a heat transfer buffer. Architectural detailing currently calls for locating rigid insulation between the exterior veneer system and the internal weather/air barrier. However, the use of metal studs between the inner and outer frame reduces the effectiveness of the cavity somewhat. These details also usually require numerous metal fasteners (screws) which short circuit the assembly and provide a path of least resistance for thermal conductance, accounting for a not insignificant amount of heat transfer. Some current systems also provide field assembled thermally improved framing systems which rely on the skill of the installers to maintain the integrity of the system.

Therefore, there is a need in the art for an improved green building technology that securely attaches an exterior wall system to structural framing while greatly reducing heat transfer through the thermal weak points, materials with high thermal conductivity such as metal.

SUMMARY

A thermally broken framing system and method of use are disclosed. The thermal framing system is comprised generally of a structural stud, exterior retention framing and a fastener system comprised of thermal spacer material, and structural fasteners.

In one embodiment, a T-shaped member may be utilized for flat walls such as masonry walls, while still providing a thermal break. In this embodiment, a flat wall, is provided. A representative modified T-shaped member is provided and secured to the wall. The T-shaped member is comprised of a portion capable of lying in a generally flattened configuration against the wall and a structural tab, which extends in a generally perpendicularly orientation relative to the wall.

In another representative embodiment, the structural stud, in cross section is C-shaped. At the ends of the structural stud is a pair of protruding end members to provide extra structural integrity. At one end of the structural stud is a structural tab facing in the direction of the exterior retention framing. The structural tab can be further comprised of at least one aperture; located at regular intervals. The apertures are roughly the same size as the thermal spacers.

The exterior retention framing is comprised generally of a retention face represented as and two framing tabs. The framing tabs are attached to the retention face. The framing tabs can be attached by any method suitable in the art and can be in any suitable configuration relative to the retention face.

It one representative preferred embodiment, the framing tabs are constructed in a method wherein they are an extension of the retention face, folded back with closed hems at each respective end and then folded perpendicular to the retention face to create a 'double T' shape. The framing tabs could also be formed in other ways such as, for example, from two bent plates in the standard L-shape, wherein one leg of the L is a framing tab and one leg of the L is half of the retention face, or wherein the retention face is a flat face design mechanically fastened to a U-shaped channel to create the framing tabs.

The framing tabs have framing tab apertures. These are typically placed at regular intervals from each other to match the spacing of the aperture. These apertures are roughly the same size as the structural fasteners.

The structural stud is positioned such that the structural tab is between the framing tabs and the structural tab apertures and framing tab apertures are aligned. In one representative preferred embodiment, a single structural tab is positioned between the two framing tabs. However, other configurations are possible. For example, there could be more or differently shaped tabs on either the structural stud or exterior retention framing portions and or they tabs could interlock differently. With the respective apertures aligned to each other, thermally insulating fastening units are placed through the apertures.

In the representative preferred embodiment, the respective thermal fastening units are each comprised of two parts: a structural fastener, respectively within a thermal spacer. The structural fastener is comprised of a material, such as a metal, capable of providing the strength needed to secure the exterior framing portion to the structural stud while under live and dead loads imposed by forces on the wall assembly and capable of withstanding fire resistance testing. The surrounding thermal spacer is comprised of an insulating material or layers of insulating materials that have a substantially lower thermal conductance than the structural tab or framing tabs.

The thermal fastening units can also be comprised of a single piece construction, such as, for example, a steel bar coated with a polymer such as a plastic or resin, or a peg made of a material with a suitable combination of sufficiently high strength and substantially lower thermal conductance than the metal framing. They can also be comprised of suitable alternate materials, such as a ceramic with high shear strength or a thermoplastic with high fire resistance and suitable structural properties.

These thermal fastening units are of sufficient strength to resist shear forces created by the structural tab of the structural stud pulling away from the framing tabs of the exterior retention framing. With the use of thermal fastening units at the connection points between the tabs, the relatively highly conductive materials forming the tabs and are thermally insulated from transferring heat between the exterior retention framing and structural stud.

Other configurations based on the invention are possible as well. As a few examples, the thermal spacer can be a U-shaped thermal spacer, a modified L-shaped member can be utilized where an existing stud is already present, a modified, the exterior retention framing may be a pair of L-shaped retention members, or the exterior retention framing may be a flat plate attached to a U-shaped tab member.

DETAILED DESCRIPTION OF PREFERRED EMBODIMENTS

Other objects, features and advantages of the invention will become apparent from a consideration of the following detailed description and the accompanying drawings. The following descriptions are made referring to the figures, wherein like reference numbers refer to like features throughout this description. Because of the varying angles of view, some features visible in some figures may not be visible, or shown, in others.

Figure 7:
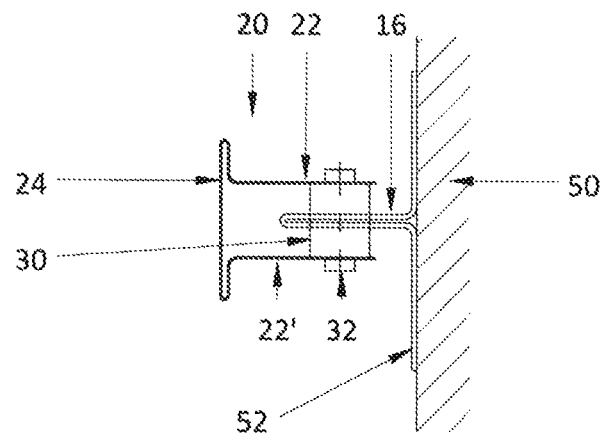
FIG. 7 is a top plan view of another possible embodiment of the invention.

For purposes of this application, attention is directed specifically to the embodiment shown in FIG. 7.

Figure 1:
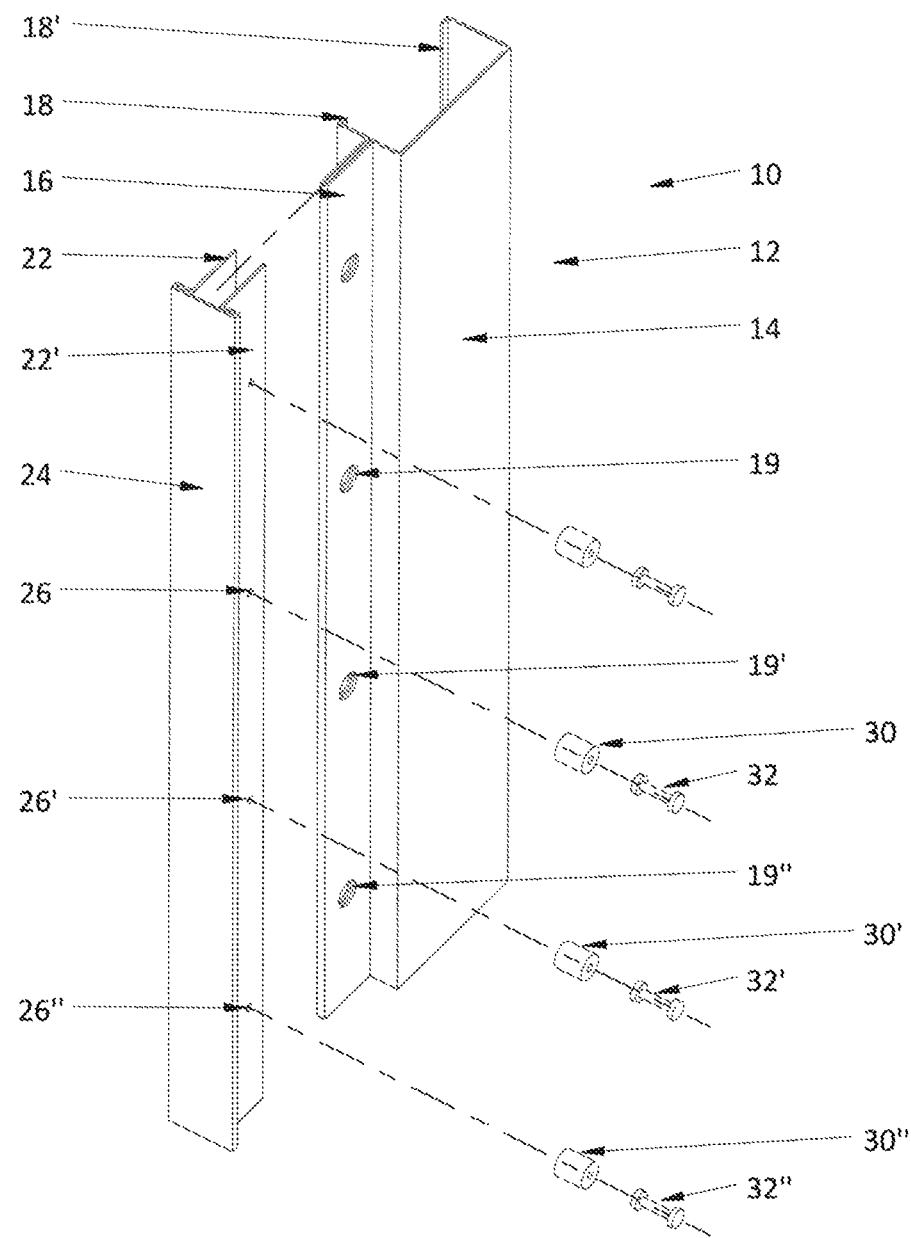
FIG. 1 is an isometric view of one embodiment of the apparatus of the invention.
Figure 2:
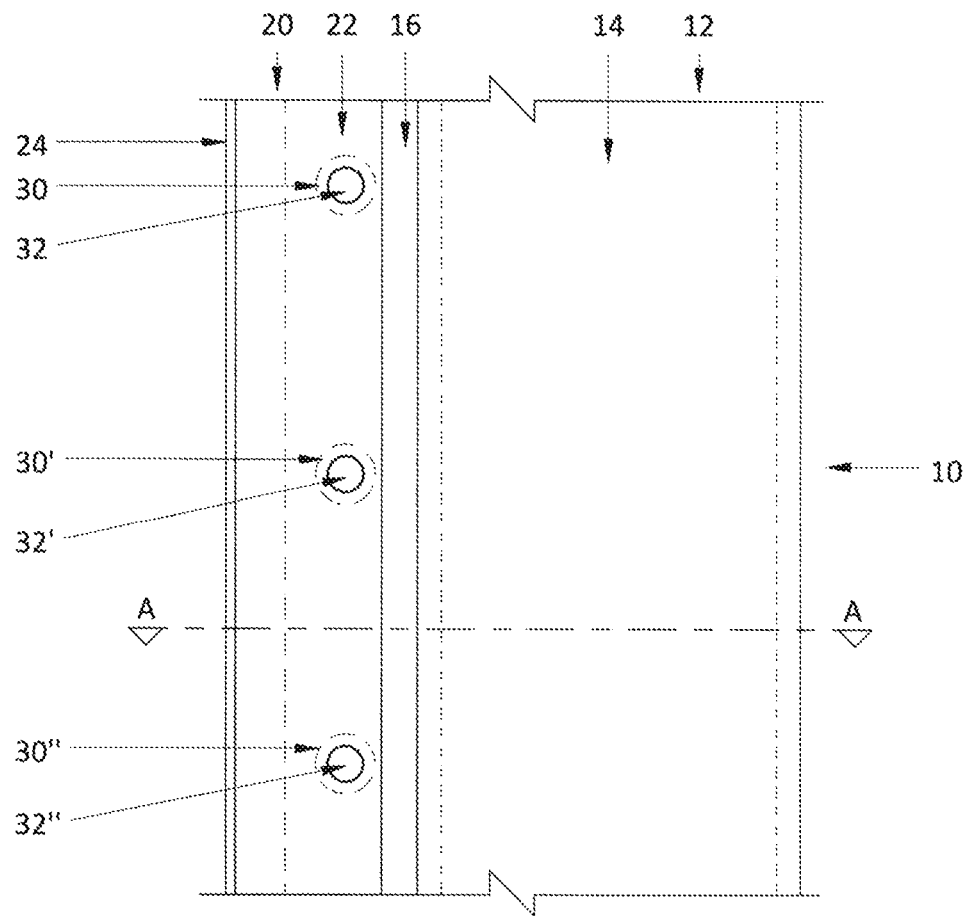
FIG. 2 is a side view of the embodiment of FIG. 1.
Figure 3:
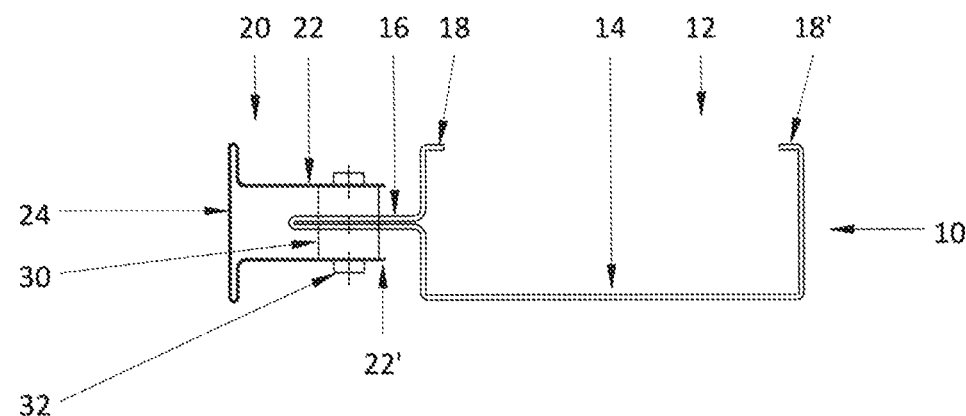
FIG. 3 is a top plan view of the embodiment of FIG. 1.

Turning to FIGS. 1-3, another embodiment of a thermal framing system 10, and general features of the system shared by embodiments herein, are shown. The thermal framing system 10 is comprised generally of a structural stud 12, comprised of a structural member 14 and structural tab 16, exterior retention framing 20 and a fastener system comprised of thermal spacer material, represented by 30, 30', 30" and structural fasteners 32, 32', 32."

The structural member, 14 in cross section, is C-shaped in this embodiment, though it can be any suitable shape known in the art, including, but not limited to, square, rectangular, circular, or L-shaped. The structural member 14 can be made by of any suitable metallic or partially metallic material in the art and formed by any suitable method in the art, though in this embodiment, the structural member 14 is formed through a cold rolled process.

At the ends of the structural member 14 are a pair of protruding end members 18, 18' to provide extra structural integrity.

A portion of the structural stud 12 and exterior retention framing 20 are shown in the figures herein for convenience, but it is to be understood that these can run vertically for any suitable distance and in this embodiment, are from the floor to the ceiling of a given building.

At one end of the structural member 14 is a structural tab 16 facing in the direction of the exterior retention framing 20. This structural tab 16 can be formed of any suitable metallic or partially metallic material known in the art, and can be attached to the structural member by any suitable means in the art including, but not limited to, an extension of the structural framing member folded back with a closed hem, butterfly tabs cut into the structural member 14, a plate welded to the structural member 14, or a metal shape mechanically fastened to the structural member 14. The structural tab 16 is further comprised of at least one aperture; represented in this embodiment and the figures as tab apertures 19, 19', 19" located at regular intervals between 1 inch and 24 inches on center. The apertures are roughly the same size as the thermal spacers 30, 30', 30".

The exterior retention framing 20 is comprised generally of a retention face represented as 24 and two framing tabs 22

22.' The framing tabs 22, 22' are attached to the retention face 24. The framing tabs 22, 22' can be attached by any method suitable in the art and can be in any suitable configuration relative to the retention face. It this embodiment, the framing tabs 22, 22' tabs are constructed in a method wherein they are an extension of the retention face 24 folded back with closed hems at each respective end and then folded perpendicular to the retention face 24 to create a 'double T' shape. The framing tabs 22, 22' could also be formed in other ways such as, for example, from two bent plates in the standard L-shape, wherein one leg of the L is a framing tab 22 and one leg of the L is half of the retention face 24, or wherein the retention face 24 is a flat face design mechanically fastened to a U-shaped channel to create the framing tabs 22 and 22.'

The framing tabs 22, 22' have framing tab apertures, represented as 26, 26', 26." These can be any suitable number of one or more, and are typically placed at regular intervals from each other to match the spacing of aperture 19, 19' and 19". These apertures are roughly the same size as the structural fasteners 32, 32', 32."

The structural member 14 is positioned such that the structural tab 16 is between the framing tabs 22 22' and the structural tab apertures 19, 19', 19" and framing tab apertures 26, 26', 26" are aligned. In this embodiment, a single structural tab 16 is positioned between the two framing tabs 22, 22'. However, other configurations are possible. For example, there could be more or differently shaped tabs on either the structural stud 12 or exterior retention framing 20 portions and/or they tabs could interlock differently. For example, this arrangement could be reversed, with a pair of tabs protruding from the structural stud portion 12 and a single interlocking tab protruding from the exterior retention framing 20.

With the respective apertures 19, 19', 19" 26, 26', 26" aligned to each other, thermally insulating fastening units 30-32; 30'-32'; 30"-32" are placed through the apertures 19, 19', 19" 26, 26', 26"

In this embodiment, the respective thermal fastening units, represented as 30-32; 30'-32'; 30"-32" are each comprised of two parts: a structural fastener, respectively 32, 32', 32" within a thermal spacer 30, 30', 30" The structural fastener is comprised of a material, such as a metal, capable of providing the strength needed to secure the exterior framing portion 20 to the structural stud 12 while under live and dead loads imposed by forces on the wall assembly and capable of withstanding fire resistance testing. The surrounding thermal spacer 30 is comprised of an insulating material or layers of insulating materials that have a substantially lower thermal conductance than the structural tab 16 or framing tabs 22, 22'. The thermal spacer 30 can also be comprised of a 'softer' vibration damping material to create a stud framing system with improved acoustical properties.

The thermal fastening units 30-32; 30'-32'; 30"-32" can be comprised of any suitable combination for providing sufficient strength and thermal isolation, such as, for example, a steel rivet, screw, or pin surrounded by a gasket made of rubber, silicone, nylon, thermoplastic polymer or similar material. In this embodiment, the thermal spacer 30, 30', 30" can be placed into the apertures 19, 19', 19" and then the rivet, screw or pin of the structural fastener 32, 32', 32" secures the framing tabs 22, 22' against opposite sides of the thermal spacers 30, 30', 30". Alternatively, the thermal spacers 30, 30', 30" and thermal fastener 32, 32', 32" may be a single piece installed through the apertures 19, 19', 19" 26, 26', 26" at the same time.

The thermal fastening units 30-32; 30'-32'; 30"-32" can also be comprised of a single piece construction, such as, for example, a steel bar coated with a polymer such as a plastic or resin, or a peg made of a material with a suitable combination of sufficiently high strength and substantially lower thermal conductance than the metal framing. They can also be comprised of suitable alternate materials, such as a ceramic with high shear strength or a thermoplastic with high fire resistance and suitable structural properties.

This thermal fastening units 30-32; 30'-32'; 30"-32" are of sufficient strength to resist shear forces created by the structural tab 16 of the structural stud 12 pulling away from the framing tabs 22, 22' of the exterior retention framing 20. These shear forces can be calculated based on the weight of the exterior veneer system, wind loads and other common design loads used by structural engineers for existing calculations.

An optional grommet or standoff could be used to thicken the metal at the openings to help control shear forces. This washer/grommet could also be a composite piece lined with the thermal break material in addition to or in lieu of the thermal spacer surrounding the structural fastener.

With the use of thermal fastening units 30-32; 30'-32'; 30"-32" at the connection points between the tabs, 16, 22, 22', the relatively highly conductive materials forming the tabs 16 and 22, 22' are thermally insulated from transferring heat between the exterior retention framing 20 and structural member 14. The free air distance of the thermal break can be adjusted to provide the best available combination of strength and thermodynamic properties, including heat transfer through radiation and convection. In this embodiment, the thermal break is 0.05 to 0.50 inches and more specifically, about 0.25 inches (5.3 mm).

Figure 4:
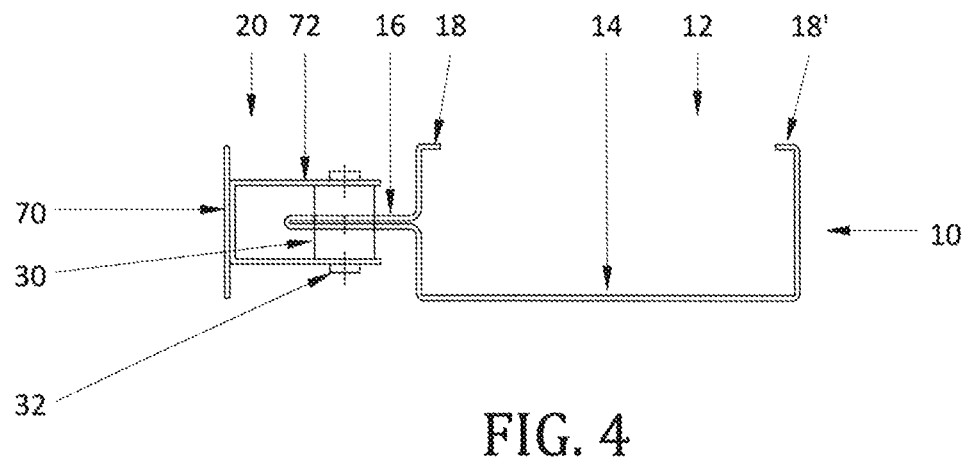
FIG. 4 is a top plan view of another possible embodiment of the invention.

Turning to FIG. 4, an alternative embodiment is shown wherein the exterior retention framing 20 is comprised, rather than of the retention face 24 and framing tabs 22, 22', of a flat plate 70 attached to a U-shaped tab member 72.

Figure 5:
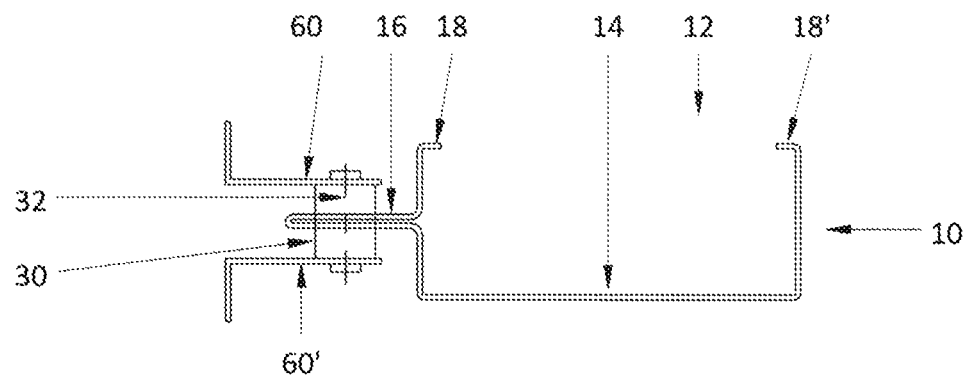
FIG. 5 is a top plan view of another possible embodiment of the invention.

Turning to FIG. 5, an alternative embodiment is shown wherein the exterior retention framing 20 is comprised, rather than of the retention face 24 and framing tabs 22, 22', of a pair of L-shaped retention members 60, 60'.

Figure 6:
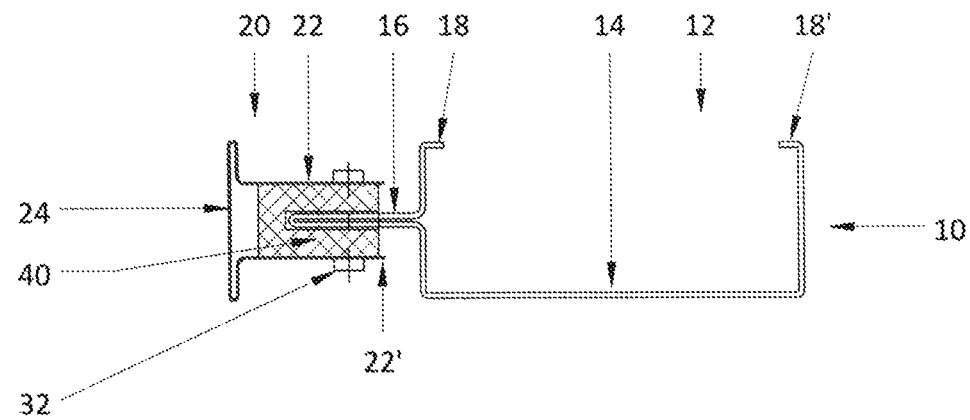
FIG. 6 is a top plan view of another possible embodiment of the invention.

Turning to FIG. 6, in another embodiment, the tab apertures 19, 19', 19" and framing tab apertures 26, 26', 26" perform as in other embodiments, but the thermal spacers 30, 30', 30" are substituted with U-shaped thermal spacer 40. The U-shaped thermal spacer 40 can be comprised of a single-piece or construction or of two individual pads that run the entire length of the structural member 14. The U-shaped thermal spacer can encapsulate the structural tab 16 rather than the use of individual spacers at each aperture.

Turning to FIG. 7, the system can further be modified in instances in which internal walls, rather than studs, provide support and need to be attached to external structures while still providing a thermal break. In this embodiment, a flat wall 50 comprised of concrete, masonry or other known construction in the art, is provided. A representative modified T-shaped member 52 with an altered shape is provided and secured to the wall 50. The representative T-shaped member 52 is comprised of a portion capable of lying in s generally flattened configuration against the wall 50 and the structural tab 16, which extends in s generally perpendicularly orientation relative to the wall. The structural tab 16 can be modified, in this or similar ways, to be part of a system designed to attach to a structural portions installed in an existing structural system. Other configurations within this overall concept are possible as well. For example, the structural tab 16 may be a pair of structural tabs, and the framing tabs 22, 22' a single framing tab such that structural tabs are on either side of s framing tab.

Figure 8:
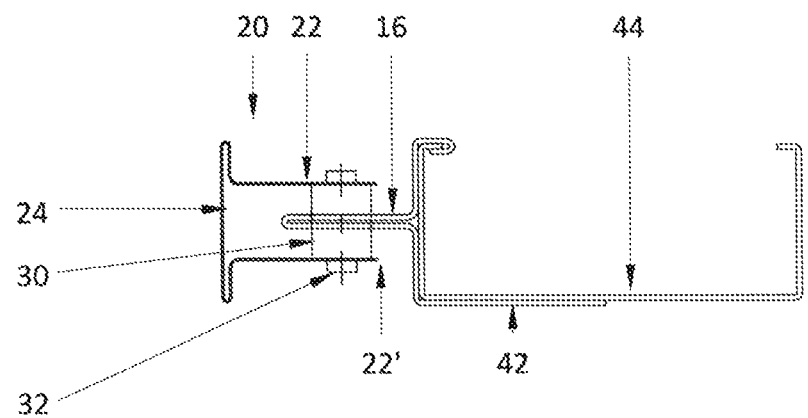
FIG. 8 is a top plan view of another possible embodiment of the invention.

Turning to FIG. 8, where an existing stud 44, and in this embodiment a metal stud, is already present, a modified L-shaped member 42, still featuring a structural member 14 and structural tab 16 of modified shape, can be utilized. The L-shaped member 42 is attached to the already-existing stud, eliminating the removal of the stud or framing. With this modification, the system can be installed in buildings with existing metal studs at minimum cost.

This design pro ides a true thermal break between the interior and exterior portion of the framing. This design can be a manufactured piece made in a factory setting and readily installed on site, or the design can be a field assembled system shipped to the site and the exterior retention framing 20 fastened to the structural member 12 by the field installer. In either variety, it has a low learning curve for installation for those installers familiar with traditional framing. The thermal fastener system described in this patent is restricted almost solely by shear forces rather than other existing systems that require calculation of multiple forces by the structural engineer, including pull-out, buckling, shear, and tensile strength of the connections.

By this apparatus and described method, a thermally broken cold formed framing system 10 is provided which provides a thermal break between an exterior of a building and its interior framing, while providing the structural strength needed to secure the inner and outer portions of the building construction to each other. By this invention, large amounts of heat transfer through metal framing can be prevented, increasing the value of installed cavity insulation and lowering mechanical (HVAC) system operating costs greatly, resulting in more energy efficient structures. This system 10 can be used by, and provide great benefit to, the construction industry and steel stud manufacturers.

It is to be understood that while certain forms of the present invention have been illustrated and described herein, the expression of these individual embodiments is for illustrative purposes and should not be seen as a limitation upon the scope of the invention. It is to be further understood that the invention is not to be limited to the specific forms or arrangements of parts described and shown.

The invention claimed is:

1. A thermal framing system comprised of:
a structural apparatus portion,
an exterior retention framing portion,
and a thermal fastener system comprised of
at least one thermal fastener comprised of at least one thermal spacer and at least one structural fastener,
wherein the at least one structural fastener is capable of fitting within the at least one thermal spacer,
and wherein the structural apparatus portion is comprised of at least one T-shaped member capable of being secured to a wall,
wherein the at least one T-shaped member is comprised of a portion capable of lying in a in a generally flattened configuration against the wall, and at least one structural tab,
wherein the at least one structural tab extends in generally perpendicular relative to the flattened portion,
and wherein the at least one structural tab is further comprised of at least one structural tab aperture,
and wherein the exterior retention framing portion is comprised of a retention face and at least one framing tab attached to, and generally perpendicular to, the retention face,
and wherein the at least one framing tab is comprised of at least one framing tab aperture,
and wherein the at least one respective framing tab aperture and the at least one structural tab aperture are each capable of accommodating the at least one thermal fastener.

2. A thermal framing system according to claim 1, wherein the at least one structural tab is a single structural tab and the at least one framing tab is a pair of framing tabs.

3. A thermal framing system according to claim 1, wherein the at least one structural tab is a pair of structural tabs and the at least one framing tab is a single framing tab.

4. A thermal framing system according to claim 1, wherein the at least one structural tab aperture is at least three structural tab apertures located at intervals of one inch to 24 inches from each other on center.

5. A thermal framing system according to claim 4, wherein the at least one framing tab aperture is at least three framing tab apertures located at intervals that match the spacing of the structural tab apertures.

6. A thermal framing system according to claim 1, wherein the thermal fastener system is further comprised of a grommet.

7. A thermal framing system according to claim 1, wherein each thermal fastener system is capable of providing a thermal break of 0.05 to 0.50 inches.

8. A thermal framing system according to claim 1, wherein the at least one structural tab is comprised of a metallic or partially metallic material.

9. A thermal framing system according to claim 1, wherein the at least one thermal spacer is comprised of an insulating material, or layers of insulating materials, that have a lower thermal conductance than the at least one structural tab and the at least one framing tab.

10. A thermal framing system according to claim 1, wherein the at least one structural fastener, is comprised of a steel rivet, screw or pin, surrounded by the at least one thermal spacer,
and wherein the at least one thermal spacer is comprised of rubber or rubberized material/silicone, nylon, a thermoplastic polymer, or any combination of these.

11. A thermal framing system according to claim 1, wherein the thermal spacer is comprised of a vibration damping material.

12. A thermal framing system comprised of:
a structural apparatus portion,
an exterior retention framing portion,
and a thermal fastener system comprised of at least one thermal fastener of single piece construction,
and wherein the structural apparatus portion is comprised of at least one T-shaped member capable of being secured to a wall,
wherein the at least one T-shaped member is comprised of a portion capable of lying in a in a generally flattened configuration against the wall,
and at least one structural tab,
wherein the at least one structural tab extends in generally perpendicular relative to the flattened portion,
and wherein the at least one structural tab is further comprised of at least one structural tab aperture,
and wherein the exterior retention framing portion is comprised of a retention face and at least one framing tab attached to, and generally perpendicular to, the retention face,
and wherein the at least one framing tab is comprised of at least one framing tab aperture, and wherein the at least one respective framing tab aperture and the at least one structural tab aperture are each capable of accommodating the at least one thermal fastener.

13. A thermal framing system according to claim 12, wherein the at least one structural tab is a single structural tab and the at least one framing tab is a pair of framing tabs.

14. A thermal framing system according to claim 12, wherein the at least one structural tab is a pair of structural tabs and the at least one framing tab is a single framing tab.

15. A thermal framing system according to claim 12, wherein the at least one structural tab aperture is at least three structural tab apertures located at intervals of one inch to 24 inches from each other on center.

16. A thermal framing system according to claim 15, wherein the at least one framing tab aperture is at least three framing tab apertures located at intervals that match the spacing of the structural tab apertures.

17. A thermal framing system according to claim 12, wherein each thermal fastener system is capable of providing a thermal break of 0.05 to 0.50 inches.

18. A thermal framing system according to claim 12, wherein the at least one structural tab is comprised of a metallic or partially metallic material.

19. A thermal framing system according to claim 12, wherein the at least one thermal fastener is comprised of a wooden peg, a ceramic, a high-strength thermoplastic, or
 a steel bar coated with a plastic, resin, or other polymer, or combination of polymers.

20. A thermal framing system comprised of:
A structural apparatus portion,
an exterior retention framing portion,
and a thermal fastener system that is comprised of either
 at least one thermal fastener comprised of a single piece, or
 at least one thermal fastener comprised of at least one thermal spacer and at least one structural fastener, wherein the at least one structural fastener is capable of fitting within the at least one thermal spacer,
and wherein the structural apparatus portion is comprised of at least one T-shaped member capable of being secured to a wall,
wherein the at least one T-shaped member is comprised of
 a portion capable of lying in a in a generally flattened configuration against the wall,
 and a structural tab,
wherein the structural tab extends in generally perpendicular relative to the flattened portion,
and wherein the structural tab is further comprised of at least one structural tab aperture,
and wherein the exterior retention framing portion is comprised of a flat plate attached to a U-shaped tab member,
wherein the U-shaped member is comprised of a base portion and a pair of arms extending perpendicularly from the base portion,
and wherein the exterior retention framing portion flat plate is attached to the U-shaped member at the base portion,
and wherein the U-shaped tab member is comprised of at least a pair of tab member apertures, located respectively on each of the arms of the U-shaped tab member,
and wherein the at least one framing tab is comprised of at least one framing tab aperture,
and wherein the at least one respective framing tab aperture and the at least one structural tab aperture are each capable of accommodating the at least one thermal fastener.

* * * * *